Figure 7:
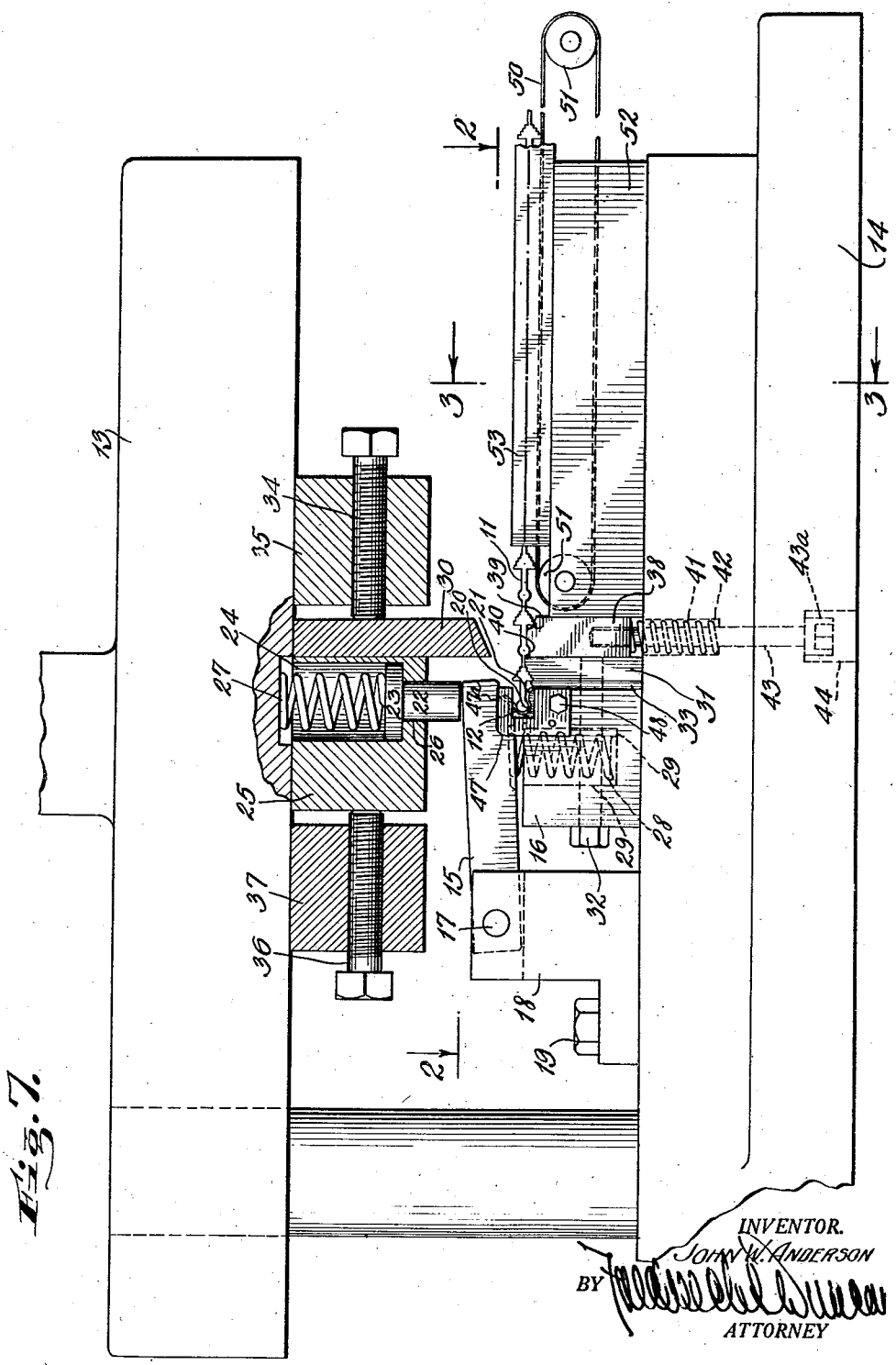

Nov. 22, 1932.   J. W. ANDERSON   1,888,843
APPARATUS AND METHOD FOR MANUFACTURING WINDSHIELD WIPER BLADES
Filed March 4, 1931   4 Sheets-Sheet 1
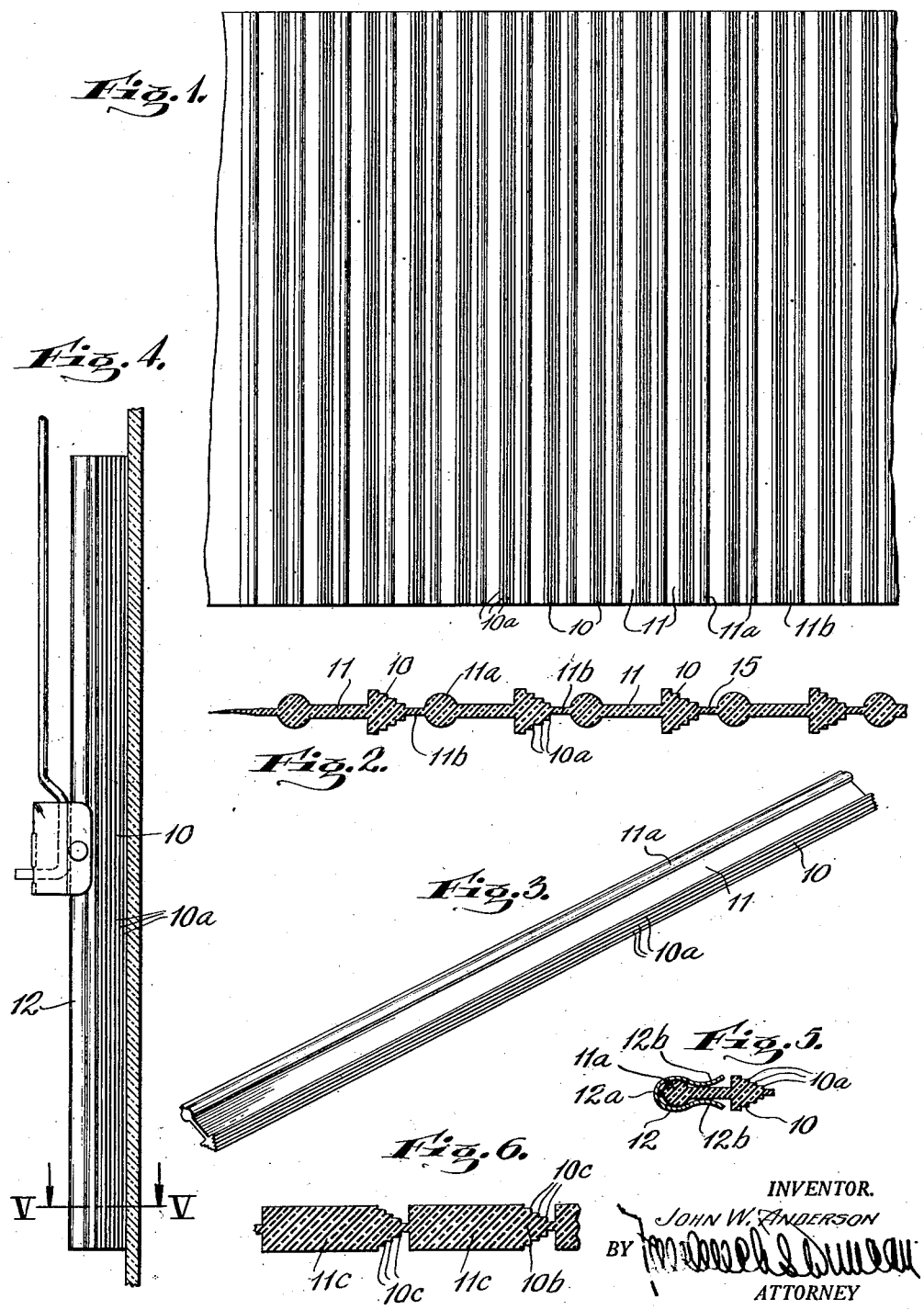

Nov. 22, 1932. J. W. ANDERSON 1,888,843
APPARATUS AND METHOD FOR MANUFACTURING WINDSHIELD WIPER BLADES
Filed March 4, 1931  4 Sheets-Sheet 2

INVENTOR.
John W. Anderson
BY
ATTORNEY

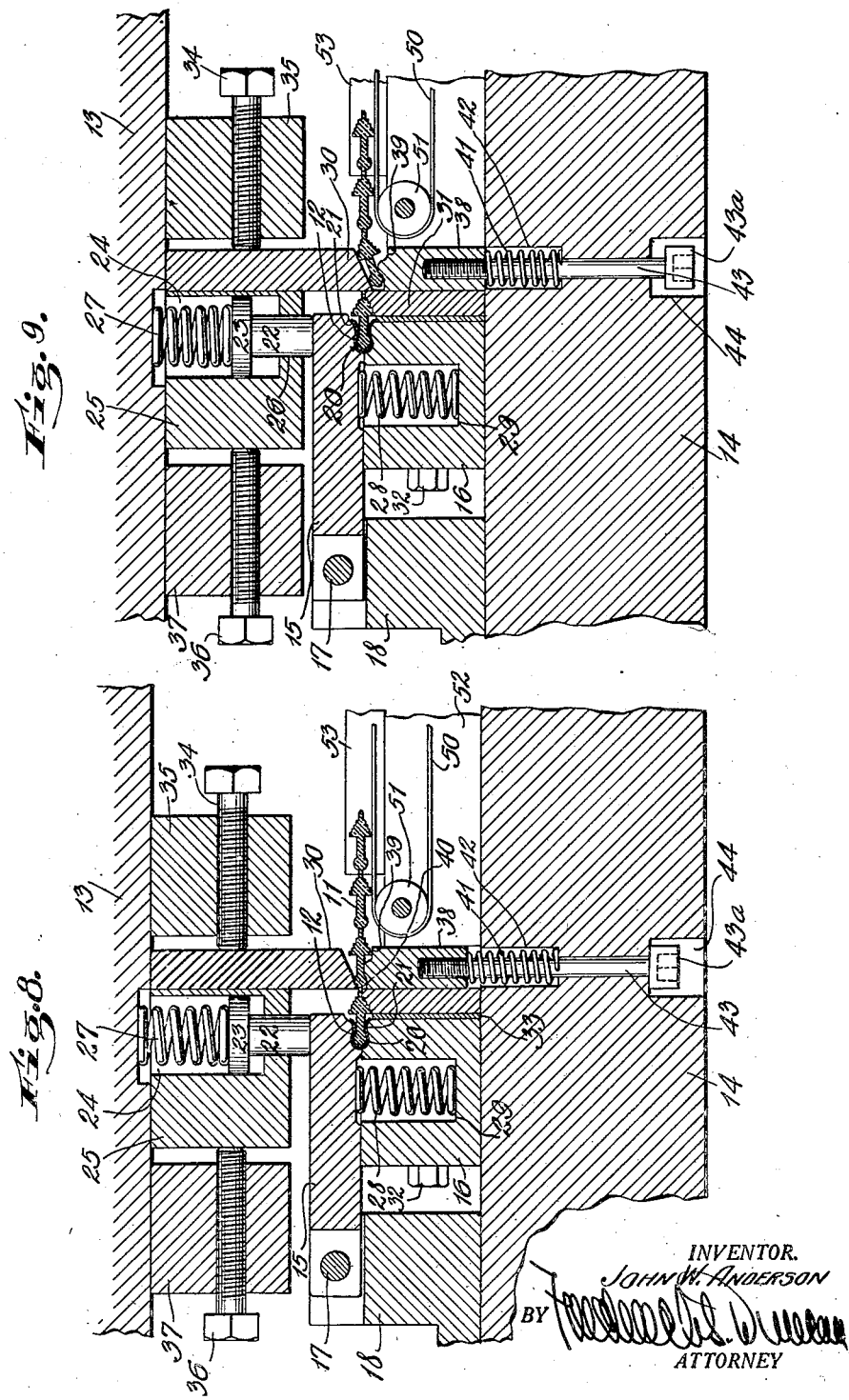

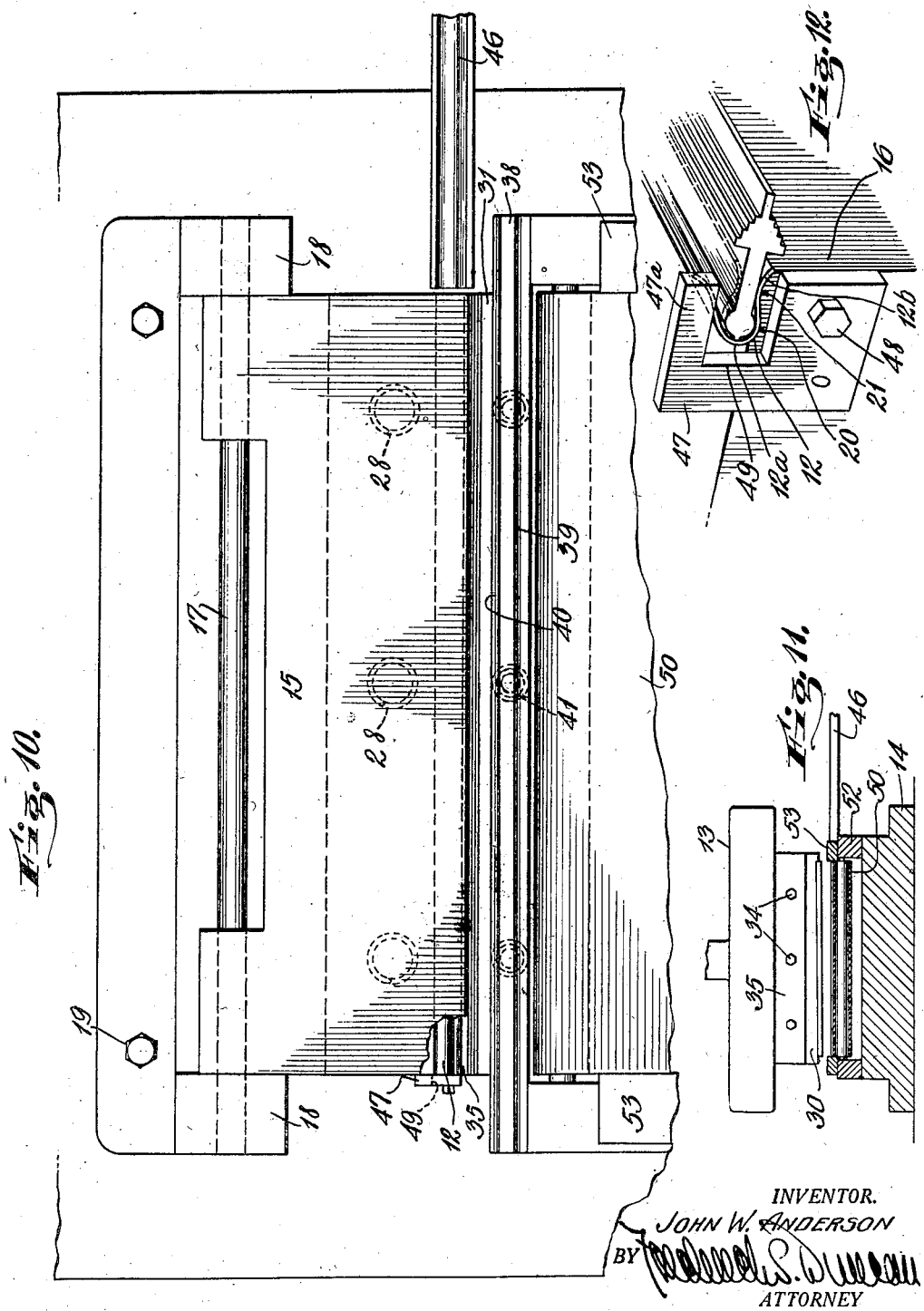

Patented Nov. 22, 1932

1,888,843

UNITED STATES PATENT OFFICE

JOHN W. ANDERSON, OF GARY, INDIANA

APPARATUS AND METHOD FOR MANUFACTURING WINDSHIELD WIPER BLADES

Application filed March 4, 1931. Serial No. 519,971.

The present invention relates to apparatuses and methods for manufacturing windshield wiper blades, and has for an object to provide an apparatus adapted to successively receive channel shape holders for windshield wiper blades; to feed a blank comprising a plurality of windshield wiper strips, so as to position the shank of successive wiper strips in the channels of successively fed holders; to bend each holder into gripping engagement with the shank; and then to sever the strip so provided with a holder, from the shank.

Another object of the invention is to provide an apparatus of the character indicated, comprising means for feeding successive holders with their channels wide open, to a position to receive the shank of the wiping strip; means for bending the holder into gripping engagement with the shank; and means for stopping the movement of the holder after it reaches the position to receive the shank of the wiper strip, until it is bent into gripping engagement therewith and then permit the holder with its wiping strip to be ejected by an incoming holder.

Another object of the invention is to provide an apparatus enabling windshield wiper blades having a channeled holder and a flexible wiper strip to be expeditiously manufactured at a substantial economy in labor and material.

Another object of the invention is to provide an improved method of manufacturing windshield wiper blades comprising the steps of forming a blank comprising a plurality of wiping strips; feeding the blank so as to dispose the shanks of successive strips in the channels of successive holders; bending successive holders into gripping engagement with successive shanks; and severing the strips with their holders in place, from the blank.

Another object of the invention is to provide an improved method of manufacturing windshield wiper blades having flexible wiping strips and channeled metal backs, whereby a substantial economy in labor and material is effected.

Various other objects and advantages of the invention will appear as the accompanying description of one embodiment thereof proceeds, and the novel features will be particularly and distinctly pointed out in the appended claims.

In the accompanying drawings:

Fig. 1 is a plan view of a blank comprising a plurality of wiping strips;

Fig. 2, a side view, on an enlarged scale, of the blank shown in Fig. 1;

Fig. 3, a perspective view of one of the flexible wiper strips severed from the blank;

Fig. 4, a side view of a windshield wiper blade having a channel shape holder and a flexible wiper strip;

Fig. 5, a cross section of the windshield wiper blade shown in Fig. 4, taken on line 5—5 of that figure;

Fig. 6, a side view of a modified form of blank;

Fig. 7, a side view partly in elevation and partly in vertical longitudinal section, showing an apparatus for feeding a blank and applying channel shape holders to wiper strips thereof, the parts being disposed in initial position with the holder fully open and the shank of a wiper strip fed thereunto;

Fig. 8, a vertical longitudinal section of a portion of the construction shown in Fig. 7, the parts being shown in the position they occupy after the holder has been bent to grip the shank of the wiper strip;

Fig. 9, a view similar to Fig. 8, showing the position of the parts after the wiper strip gripped in the holder has been severed from the blank.

Fig. 10, a fragmentary top plan view of the apparatus shown in Fig. 7, with the upper platen and its associated parts removed;

Fig. 11, a front end view, on a reduced scale, partly in elevation and partly in vertical transverse section, of the apparatus shown in Fig. 7; and Fig. 12, a detail perspective view, on an enlarged scale, showing a holder fully open disposed between the bending jaws and abutting against the stop plate, and a wiper strip having its shank disposed in the holder, the position to which the holder is bent to grip the shank, being indicated in dotted lines, in which position the holder is clear of the stop and free to be ejected from the jaws through the notch in the stop plate.

One form of blank which may be employed in practicing the present invention is shown in Figs. 1 and 2. This blank may be produced, for example, by placing a sheet of uncured rubber between two mold members suitably shaped so that when brought together they will impart to the sheet a conformation like that shown in said figures. The sheet is then suitably cured so as to adapt it to retain the imparted form. It will be noted that the sheet so produced comprises a plurality of wiping strips each embodying a wiping portion 10 and a shank 11. The wiping portion is in the form of an enlarged head having a plurality of longitudinal wiping edges or arrises 10a, on each side, and the shank is formed with a longitudinal cylindrical bead 11a, adapted to anchor it in the channel of a U-shape metal holder 12, as shown in Fig. 5, and a web 11b adapted to be severed to effect detachment of a wiper strip from the blank. One of the severed wiper strips is shown in Fig. 3. A complete blade, comprising a wiping strip and a channel shape holder is shown in Figs. 4 and 5.

In the modified form of blank shown in Fig. 6, each wiping strip has a wiping portion 10b, formed at each side with a plurality of longitudinal wiping edges or arrises 10c, and a shank 11c made of the same thickness as the wiping portion.

In order to attach the channel shape holders 12 to the shanks 11 of successive wiper strips, and then to sever the wiper strips from the blank, the apparatus shown in Figs. 7 to 12 is employed. This apparatus comprises an upper movable platen 13 and a fixed lower platen 14. Mounted on the lower platen are a pair of forming jaws 15 and 16 adapted to contract to bend metal holders 12 into gripping engagement with the shanks of wiper strips. The lower jaw 16 is fixed with relation to the lower platen 14, while the upper jaw 15 is free to move, being pivoted at one end by a pin 17 to a pair of supports 18, which in turn are secured to the platen 14 by bolts 19. The opposed faces at the fronts of the jaws are each formed with a pair of grooves 20 and 21 adapted to receive a channel shape holder 12, and to bend it to grip the shank 11 of a wiper strip, when the jaws are brought together. It will be noted that the rear portion 12a of the holder is substantially cylindrical in form and fits in the grooves 20 of the jaws, and that its front edges 12b are flared away from the shank adjacent the line of bend thereof, and fit in the grooves 21 of the jaws.

To provide for yieldingly pressing the jaws together so as to bend the holder 12 into shank gripping position, pressure rods 22 are employed. Each of these rods has a head 23 fitted in one of the chambers 24 provided in the truing block 25 carried by the upper platen 13. The rods project through openings 26 in the bottom walls of the chambers 24, and bear on the top of the pivoted jaw 15. Disposed in each of the chambers is a helical spring 27, having its upper end bearing against the upper platen 13 and its lower end bearing on the head 23 of a pressure rod. It will be obvious from the foregoing that the pressure rods act when the upper platen is lowered to yieldingly force the pivoted jaw 15 toward the fixed jaw 16, thus causing the jaws to bend the holder into gripping engagement with the shank of the wiper strip, and after the jaws are closed, to permit further downward movement of the upper platen to effect cutting of the strip from the blank.

To effect the return of the pivoted jaw 15 to initial position, there are provided helical springs 28 which are disposed in chambers 29 in the lower jaw 16. The lower ends of these springs bear on the bottom walls of the chambers 29 and their upper ends bear against the bottom side of the pivoted jaw 15. It will thus be noted that when the upper platen is returned to initial position the springs will raise the pivoted jaw to permit the insertion of another holder 12.

To provide for cutting off successive wiper strips from the blank, after the application of channel metal holders 12 thereto, an upper shear blade 30 and a lower shear blade 31 are employed. The lower shear blade 31 is fixed to the lower platen 14 by bolts 32 which pass through the jaw 16 and a spacer plate 33. The upper shear blade 30 is carried by the upper platen 13 for movement therewith, and is gripped between bolts 34 passing through the transverse bar 35 rigidly secured to the upper platen, and the slidable truing bar 25, which bar is gripped by bolts 36 screw threaded through the transverse bar 37, fixed to the upper platen.

Disposed in front of the lower shear blade 31 is a yielding guide block 38 having its top face formed at one side with a groove 39, adapted to receive the head 10 of a wiper strip, and at its other side with a groove 40, adapted to receive the head of a wiper strip. This block is mounted on springs 41, to adapt it to yield when the upper shear blade 30 descends, and to return it to initial position when the upper blade is raised. The springs 41 are disposed in recesses 42 in the lower platen 14. Upward movement of the guide block 38 under action of the springs, is limited by bolts 43, having their upper ends passing through the springs 41 and screw threaded into the guide block, and their lower ends formed with heads 43a, disposed in recesses 44 in the lower platen.

To provide for successively feeding holders 12 between the forming jaws 15 and 16, a guide trough 46, mounted on one side of the apparatus, is employed.

In order to position each holder 12, when it is fed between the forming jaws, so that it will be properly aligned for the reception of the shank of a wiper strip, a stop plate 47 is employed. By referring to Fig. 12, it will be noted that the plate is fastened by a bolt 48 to one end of the lower jaw 16 and is formed at its front with a notch or recess 49. When a holder is fed between the forming jaws 15 and 16, its upper side wall 12b will abut the arm 47a of the stop plate 47, thus aligning the holder with the incoming shank 11 of a wiper strip. After the holder has been bent to grip the shank, by the jaws 15 and 16, both of its side walls will be clear of the top and bottom edges of the notch 49, so that the holder may slide freely therethrough under the push of an incoming holder fed from the trough 46.

To provide for advancing the blank so as to feed the shanks of successive wiper strips into successive holders, a conveyor belt 50 is employed. This belt is mounted to travel on rollers 51, which are journaled in bars 52 supported on the platen 14. To guide the blank in its traverse along the conveyor belt so as to accurately position the shanks of successive strips in successive holders 12, guides 53 are provided, one on each side of the belt. These guides are fastened to the tops of the bars 52.

From the foregoing description, it will be noted that the operation of the apparatus is as follows. Assuming that the upper platen is in initial position with the jaw 15 raised, as shown in Fig. 7, one of the U-shaped holders 12 with flared side walls is fed from the guide 46 in between the jaws 15 and 16. The blank is then advanced along the conveyor belt so as to fit the shank 11 of the foremost strip into the channel of the holder 12. The upper platen is then lowered causing the jaw 15 to descend and bend the holder into gripping engagement with the shank 11 of the wiper strip, as shown in Fig. 8. Further downward movement of the platen causes the shear blades 30 and 31 to coact to sever the foremost blank from the sheet, as shown in Fig. 9. The upper platen is then raised and as the holder 12 in its bent position is free to clear the stop 47, the completely assembled blade may be ejected from between the jaws through the notch 49 in the stop plate, by the push of another holder being fed between the jaws. After the blade has been ejected, the fin at the front of its wiper head may be trimmed off in any suitable cutting machine, so as to insure a true wiping edge.

The method of the present invention comprises the steps of forming a blank embodying a plurality of parallel windshield wiper strips; feeding successively channel shape holders between a pair of bending jaws; feeding the blank so as to dispose the shanks of successive strips into the channels of successive holders; contracting the jaws so as to bend each holder into gripping engagement with a wiper strip shank; severing successive wiper strips from the blank after the holder is applied; and then ejecting the assembled blade from between the jaws.

While a preferred method and apparatus for practicing the invention have been fully set forth, it is to be understood that various changes in the procedure of the method, and various modifications in the form, assembly, and operation of the parts of the apparatus, may be resorted to, without departing from the spirit and scope of the invention as defined in the appended claims.

The invention claimed and desired to be secured by Letters Patent is:

1. In an apparatus for manufacturing windshield wiper blades, the combination of, means for bending the sides of channel shape holders into gripping engagement with the shanks of wiper strips; means for feeding a blank comprising a plurality of parallel wiper strips so as to successively dispose the shanks of successive strips in position for the application of a holder by the first mentioned means; and means for severing each successive strip from the blank after its holder has been applied thereto.

2. In an apparatus for manufacturing windshield wiper blades, the combination of means for bending the side walls of channel shape holders into gripping engagement with the shanks of wiper strips; means for feeding a blank comprising a plurality of parallel wiper strips so as to dispose the shanks of successive strips in the channels of successive holders; and means for severing successive strips from the blanks.

3. In an apparatus for manufacturing windshield wiper blades, the combination of means for bending the side walls of channel shape holders into gripping engagement with the shanks of wiper strips; means for feeding a blank comprising a plurality of parallel wiper strips so as to dispose the shanks of successive strips in the channels of successive holders; and co-acting shear members for severing successive strips from the blanks.

4. In an apparatus for manufacturing windshield wiper blades, the combination of a pair of jaws for bending the side walls of channel shape holders into gripping engagement with the shanks of wiper strips; means for feeding a blank comprising a plurality of parallel wiper strips so as to dispose the shanks of successive strips in the channels of successive holders; and a pair of co-acting shear members for severing successive strips from the blank after their respective holders have been applied thereto.

5. In an apparatus for manufacturing windshield wiper blades, the combination of means for bending the side walls of channel shape holders into gripping engagement with the shanks of wiper strips; means for feeding a blank comprising a plurality of wiper strips so as to dispose the shanks of successive strips in the channels of successive holders; means adapted to stop each successive holder as it is fed into the bending means in alignment with the incoming shank of a wiper strip; and means for severing successive wiper strips from the blank.

6. In an apparatus for manufacturing windshield wiper blades, the combination of means for bending the side walls of channel shape holders into gripping engagement with the shanks of wiper strips; means for feeding holders successively into the bending means; and means for stopping successive holders at a predetermined position in the bending means.

7. In an apparatus for manufacturing windshield wiper blades, the combination of means for bending the side walls of channel shape holders into gripping engagement with the shanks of a wiper strip; means for feeding holders successively into the bending means; and means for stopping the successive holders at a predetermined position in the bending means, said stop means permitting the holders when bent to be ejected laterally of the bending means by the push of an incoming holder.

8. In an apparatus for manufacturing windshield wiper blades, the combination of means for bending the side walls of channel shape holders into gripping engagement with the shanks of wiper strips; means for feeding holders successively into the bending means; means for stopping the successive holders at a predetermined position in the bending means; and means for feeding the shanks of successive wiper strips into the channels of successive holders.

9. In an apparatus for manufacturing windshield wiper blades, the combination of means for bending the side walls of channel shape holders into gripping engagement with the shanks of successive wiper strips; means for feeding holders successively into the bending means; means for stopping successive holders at a predetermined position in the bending means, said stop means permitting the holders to be ejected laterally of the bending means by the push of an incoming holder; and means for feeding the shanks of successive wiper strips into the channels of successive holders.

10. In an apparatus for manufacturing windshield wiper blades, the combination of a pair of opposed relatively movable platens; means operable by relative movement of the platens to bend the side walls of channel shape holders into gripping engagement with the shanks of wiper strips; and means operable by movement of the platens for severing successive wiper strips from a blank.

11. In an apparatus for manufacturing windshield wiper blades, the combination of a pair of opposed relatively movable platens; means operable by relative movement of the platens to bend the side walls of successive channel shape holders into gripping engagement with the shanks of successive wiper strips; means for feeding a blank comprising a plurality of parallel wiper strips so as to dispose the shanks of successive strips in the successive holders; and means operable by movement of the platens for severing successive strips from the blank.

12. In an apparatus for manufacturing windshield wiper blades, the combination of a pair of jaws adapted to receive a channel shape holder and to bend the side walls thereof into gripping engagement with the shank of a wiper strip; means for opening and closing said jaws; and means operated by said opening and closing means for severing successive wiper strips from a blank.

13. In an apparatus for manufacturing windshield wiper blades, the combination of a pair of jaws adapted to receive a channel shape holder and to bend the side walls thereof into gripping engagement with the shank of a wiper strip; means for opening and closing said jaws; means operatively associated with the jaws for severing successive wiper strips from a blank; and a conveyor for feeding blanks comprising a plurality of wiper strips so as to dispose the shanks of successive strips in the channels of successive holders after the holders are disposed in bending position between the jaws.

14. In an apparatus for manufacturing windshield wiper blades, the combination of a pair of jaws, means for opening the jaws to permit the insertion therebetween of a channel shape holder having its side walls open to receive the shank of a wiper strip; means for feeding a blank comprising a plurality of parallel wiper strips so as to dispose the shanks of successive strips into the channels of successive holders; means for closing the jaws to bend the holder into gripping engagement with the shank of a wiper strip; and means for severing each successive wiper strip from the blank after its holder has been applied thereto.

15. In an apparatus for manufacturing windshield wiper blades, the combination of a pair of jaws, means for opening the jaws to permit the insertion therebetween of a channel shape holder having its side walls open to receive the shank of a wiper strip; means for feeding a blank comprising a plurality of parallel wiper strips so as to dispose the shanks of successive strips into the channels of successive holders; means for closing the jaws to bend the holder into gripping engagement with the shank of a wiper strip;

and a pair of coacting shear members for severing each successive wiper strip from the blank after its holder has been applied thereto.

16. In an apparatus for manufacturing windshield wiper blades, the combination of a pair of jaws, means for opening the jaws to permit the insertion therebetween of a channel shape holder having its side walls spread to receive the shank of a wiper strip; means for successively feeding holders between the jaws; means for feeding a blank comprising a plurality of parallel wiping strips so as to dispose the shanks of successive strips in the channels of successive holders after the holders have been positioned between the jaws; means for stopping successive holders at a predetermined position between the jaws, said stopping means permitting the holder when bent by the jaws to be ejected laterally of the jaws; means for closing the jaws to bend the holders into gripping engagement with shanks of wiper strips; and means for severing successive wiper strips from the blank after the holders have been applied thereto.

17. In an apparatus for manufacturing windshield wiper blades, the combination of a pair of jaws adapted when open to receive a channel shape holder and when closed to bend the side walls of said holder into gripping engagement with the shank of a wiper strip; resilient means for moving the jaws to open position; means for closing the jaws; coacting shear members operatively in response to movement of the jaw closing means to shear a wiper strip from a blank; means for feeding a blank comprising a plurality of parallel wiper strips so as to dispose the shanks of successive strips in the channels of successive holders; and means for stopping holders fed into the jaws laterally thereof at a position in alignment with the shank of an incoming wiper strip, said stop means being adapted to permit each successive holder after it is bent to be ejected from the jaws laterally thereof by the push of an incoming holder.

18. The method of manufacturing windshield wiper blades, comprising the steps of forming a blank embodying a plurality of parallel wiper strips; successively assembling holders on the shanks of successive strips; and severing each successive strip from the blank after its holder has been assembled therewith.

19. The method of manufacturing windshield wiper blades comprising the steps of forming a blank embodying a plurality of parallel wiper strips; applying to each of the strips a channel shape holder by bending the side walls of successive holders into engagement with the shanks of successive strips; and severing each successive strip from the blank after its holder has been bent into engagement therewith.

20. The method of manufacturing windshield wiper blades, comprising the steps of forming a blank embodying a plurality of parallel wiper strips; successively feeding channel shape holders between a pair of bending jaws when the jaws are open; feeding a blank comprising a plurality of parallel wiper strips so as to dispose the shanks of successive strips in the channels of successive holders; closing the jaws on each successive holder to bend the side walls thereof into gripping engagement with the shank of a wiper strip; and severing each successive strip from the blank after its holder has been applied thereto by the jaws.

In testimony whereof, I have signed this specification.

JOHN W. ANDERSON.